United States Patent [19]

Greenlee, III

[11] 4,284,190

[45] Aug. 18, 1981

[54] HORIZONTAL ACCUMULATING CONVEYOR

[76] Inventor: Fred S. Greenlee, III, 1970 S. West St., Wichita, Kans. 67213

[21] Appl. No.: 115,922

[22] Filed: Jan. 28, 1980

[51] Int. Cl.³ ............................................. B65G 13/07
[52] U.S. Cl. ..................................... 198/783; 198/790
[58] Field of Search ......................... 198/781, 783, 790

[56] References Cited

U.S. PATENT DOCUMENTS

| | | | |
|---|---|---|---|
| 2,253,198 | 8/1941 | Regan | 198/783 |
| 3,127,003 | 3/1964 | Goepper et al. | 198/783 |
| 3,266,617 | 8/1966 | Forsyth et al. | 198/783 |
| 3,563,365 | 2/1971 | Loberg | 198/790 |
| 3,655,029 | 4/1972 | Webb et al. | 198/783 |
| 3,958,684 | 5/1976 | Garzelloni | 198/783 X |
| 4,164,280 | 8/1979 | Duttine et al. | 198/781 |

*Primary Examiner*—James L. Rowland
*Attorney, Agent, or Firm*—John H. Widdowson

[57] ABSTRACT

A reversible accumulating conveyor having a pair of support members with apertures, a plurality of carrier rollers connected to the support members, a plurality of floating pressure rollers vertically-slidably disposed within the apertures, a support attached to the support member, a conveyor belt reversible drive, an endless conveyor belt being driven by the drive and trained over and carried by the pressure rollers, a start belt integrally bound to the conveyor belt and having predetermined characteristics distinct with respect to the conveyor belt, and the ends of the pressure rollers urged vertically upwardly within the apertures in order to pressure the endless belt against the carrier rollers.

6 Claims, 9 Drawing Figures

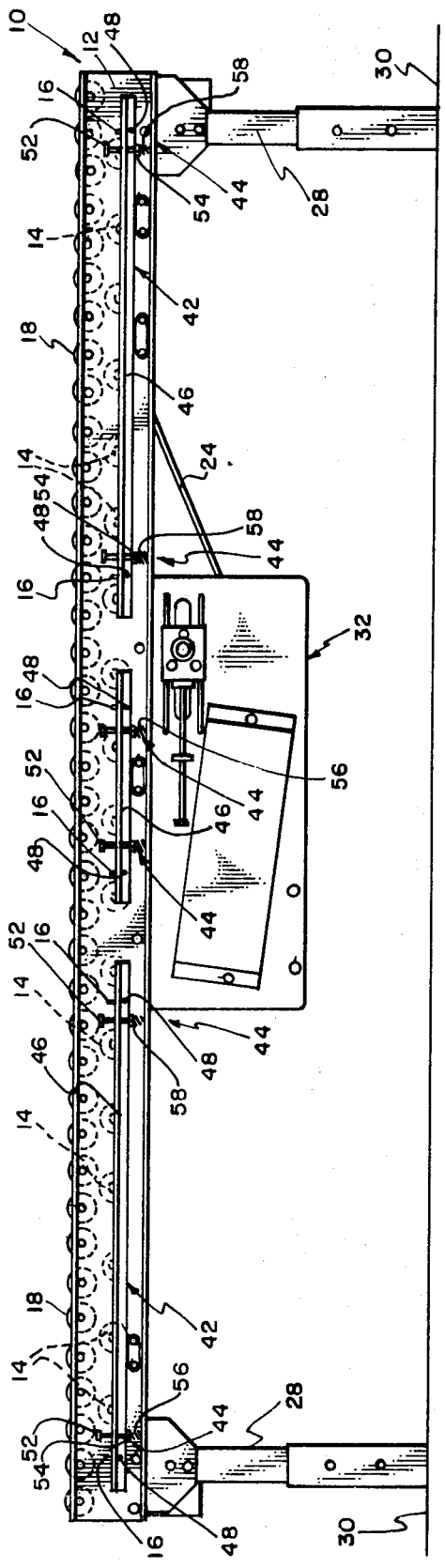
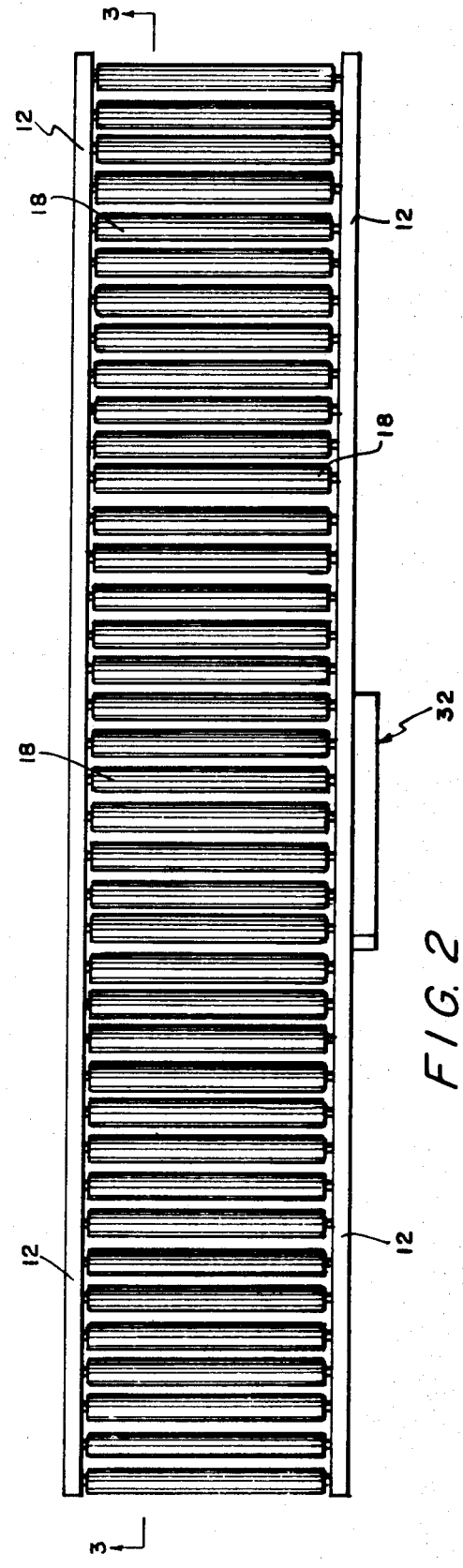
FIG. 1
FIG. 2

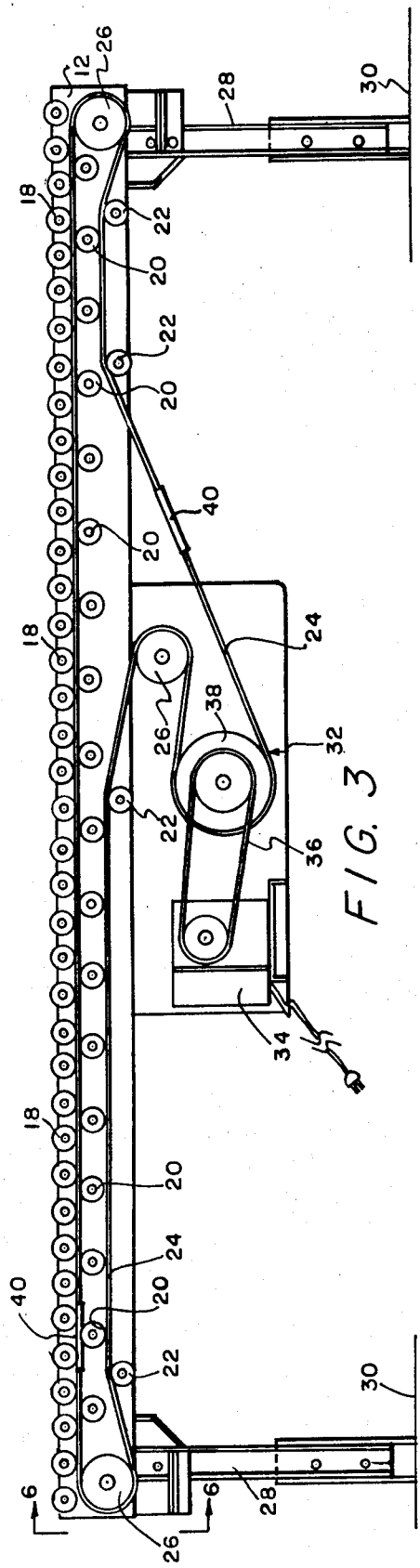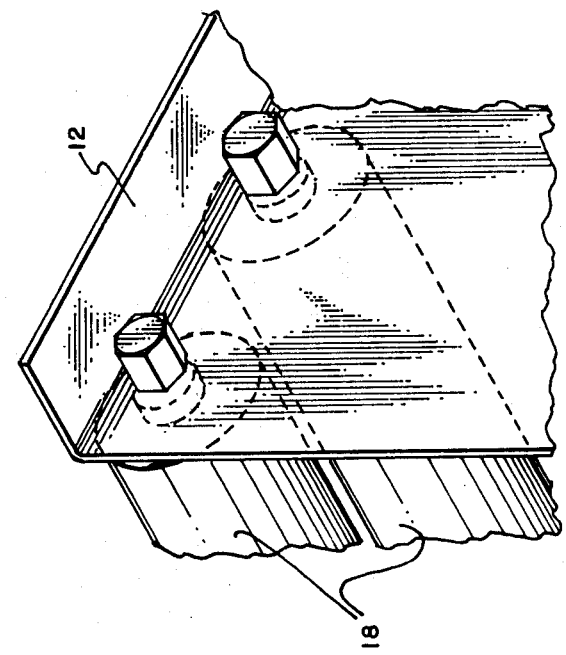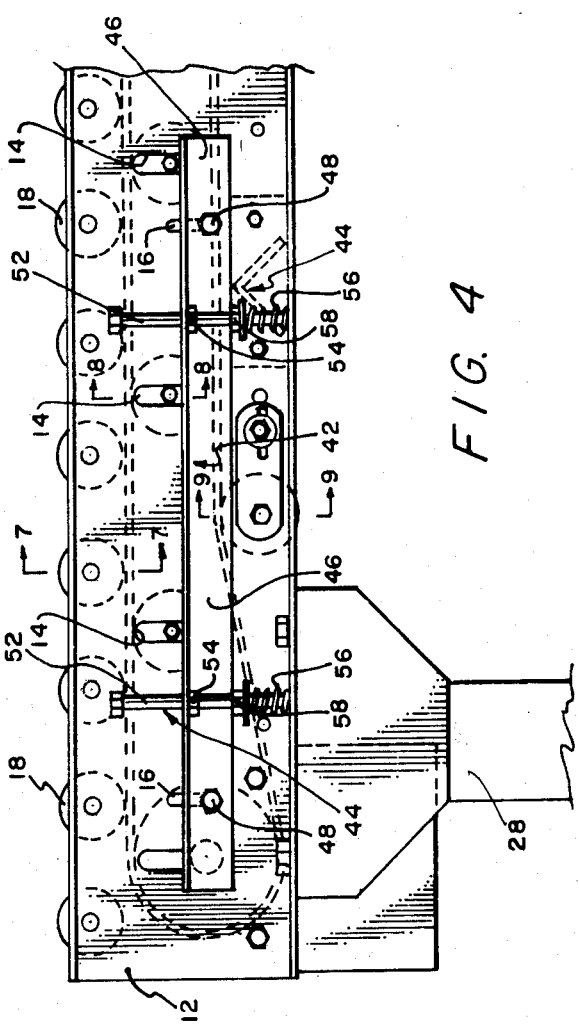
FIG. 3
FIG. 5
FIG. 4

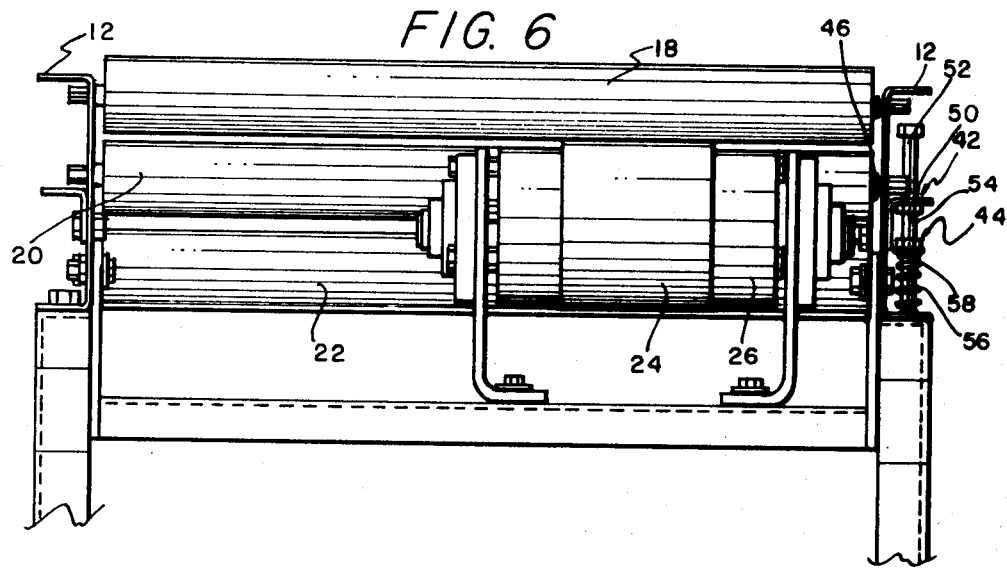
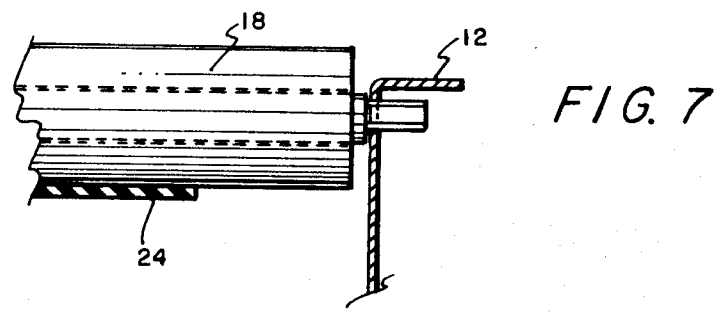
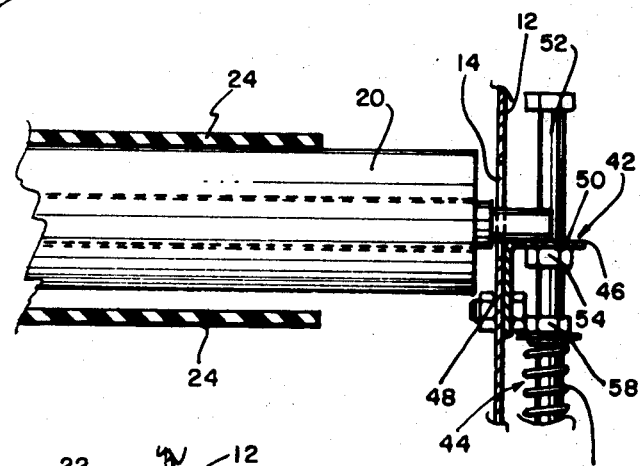
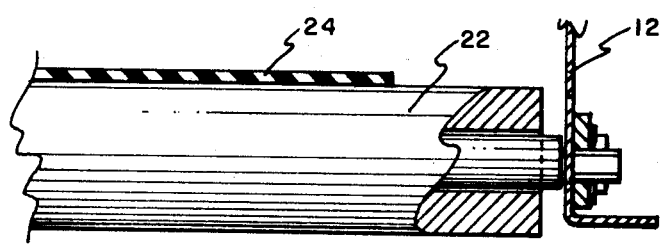

HORIZONTAL ACCUMULATING CONVEYOR

BACKGROUND OF THE INVENTION

1. Field of the Invention

This invention is related to a reversible accumulator conveyor having start-up action after the articles being conveyed have come to rest.

2. Description of the Prior Art

Accmulating conveyors as a conveyor entity became widely known to the material handling field in the late 1950's. Before that time, various types of live roller conveyors adjusted to their minimum pressure, served this function.

There are two types of accumulating conveyors on the market today. The first is of a release drive type. In principal, they operate as follows: an article is stopped on the conveyor at a trigger point. The trigger activates a linkage mechanism which removes the driving force, usually a conveyor belt or chain, from a segment of the conveyor behind the stalled article. This results in the next article stopping when this dead area is reached. A trigger mechanism located within the dead area is engaged by the second article causing a like segment behind it to lose its driving force. This process repeats itself along the entire length of the accumulating conveyor. Back pressure is usually limited to the driving force on the first article. Some of the disadvantages of the release drive type conveyors are that they operate in only one direction; articles must be heavy enough to trip the trigger; the linkage is subject to environment causing it to malfunction, and there is a limited range between lightest and heaviest articles to be conveyed.

U.S. Pat. No. 3,416,642 by Muller is a modification of the release drive type concept. In lieu of a trigger to be activated by the article this patent employs a floating center mechanism. The effect on the second and subsequent articles is the same as above.

The second type of accumulating conveyor is the "minimum pressure" type. This method has been around for over 35 years. The more recent application of this principal came about as new drive belts were developed with a low co-efficient of friction. Some have employed mechanical means to accomplish the same feat. Conveyors of this design are usually advertised with back pressures under 4%.

The essence of the minimum pressure type conveyor is to have the drive pressure low enough so as not to damage the first article from the back pressure of the second and subsequent articles, yet strong enough to drive each article when released to convey. Some of the disadvantages of this type of conveyor are that they have a limited range between light and heavy articles to be conveyed; and the length of the conveyor is limited due to linear pressure build up. U.S. Pat. No. 3,563,365 by Loberg is a minimum pressure conveyor using V-belts as the drive mechanism.

Therefore, what is needed and what has been invented by me is a reversible accumulating conveyor possessing none of the foregoing deficiencies.

SUMMARY OF THE INVENTION

It is therefore an object of this invention to provide for a reversible conveyor having spring loaded angle members in order to give pressure rollers a floating effect when the ends of the pressure rollers rest on the angle members.

It is another object of this invention to provide for a reversible conveyor having an endless belt with at least one start belt integrally bound thereto to render start-up action to the articles being conveyed by the conveyor.

The foregoing objects are accomplished by this invention. Broadly, the reversible conveyor of this invention comprises a pair of support members including a structure defining a plurality of pressure roller-resting apertures, and a plurality of carrier rollers connected to the support members and rotatable with respect thereto. A plurality of pressure rollers are vertically-slidably disposed within the pressure roller-resting apertures which are lower with respect to the situs of the carrier rollers. Support means attach to the support members and a conveyor belt reversible drive means mechanically communicates with the conveyor. An endless conveyor belt is driven by the drive means and is trained over and carried by the pressure rollers. At least one start belt is integrally bound to the conveyor belt and has predetermined characteristics distinct with respect to the conveyor belt. The reversible conveyor further comprises a means for vertically urging the ends of the pressure rollers within the pressure roller-resting apertures in order to cause the endless belt to generally maintain a constant pressure against the carrier rollers, except when the start belt is carried by the pressure rollers, and to maintain a predetermined back pressure on the conveyor belt in either a forward or a reverse direction with respect thereto.

BRIEF DESCRIPTION OF THE DRAWINGS

FIG. 1 is a side elevational view of the reversible conveyor;

FIG. 2 is a top plan view of the reversible conveyor;

FIG. 3 is a vertical sectional view taken along the plane of line 3—3 in FIG. 2;

FIG. 4 is a partial exploded side elevational view of the reversible conveyor;

FIG. 5 is a partial perspective view of the carrier rollers attached to a support member;

FIG. 6 is an end view of the reversible conveyor taken along the plane of line 6—6 in FIG. 3;

FIG. 7 is a vertical sectional view taken along the plane of line 7—7 in FIG. 4;

FIG. 8 is a vertical sectional view taken along the plane of line 8—8 in FIG. 4; and FIG. 9 is a vertical sectional view taken along the plane of line 9—9 in FIG. 4.

DETAILED DESCRIPTION OF THE INVENTION

Referring in detail now to the drawings, wherein identical reference numerals represent similar parts of the invention, there is seen the reversible accumulating conveyor of this invention, generally illustrated as 10, having support members 12 including roller-resting apertures 14 and angle retention apertures 16. A plurality of carrier rollers 18 are attached to the support members 12 and rotate with respect thereto. A plurality of floating pressure rollers 20 are vertically-slidably disposed within the apertures 14 which are underneath the carrier rollers. The floating pressure rollers 20, as can be seen in FIG. 3, are situated under and between two adjacent carrier rollers 18. Snub rollers 22 are rotatably supported by the support members 12 and aid an endless conveyor belt 24 in its return course. Direction rollers 26, two being positioned at the ends of conveyor 10 and another in the center (see FIG. 3), include a diameter larger than the diameter of carrier rollers 18, floating pressure rollers 20, snub rollers 22, and also aid the endless belt 24 in its return course.

Legs 28 are attached to the support members 12 for positioning the conveyor 10 at a desired height from a floor 30. A conveyor belt reversible drive means, generally illustrated as 32, drives the endless belt 24 in its course which includes being trained over and carried by the pressure rollers 20. Drive means 32 comprises a motor 34, a drive belt 36 and a drive drum 38.

A start belt 40 is integrally bound to the belt 24 and has predetermined characteristics distinct with respect to the belt 24. In a preferred embodiment of the invention, belt 24 should be selected for its low co-efficient of friction, thickness and strength in order that, when properly adjusted, belt 24 will exert enough driving force to keep any article on carrier rollers 18 in motion. Once the article has stopped, the belt 24 will not restart the article. Therefore, in order to restart the articles, start belt 40 is used. Start belt 40 has the characteristics of a greater thickness than belt 24 and higher co-efficient of friction to accomplish the restart. Start belt 40 is preferably inserted into belt 24 at a predetermined interval (e.g. every 30 feet). Once the article has been restarted by start belt 40, conveyor belt 24 will keep the article in motion until stopped again (e.g. manually or by an obstruction).

A means, generally illustrated as 42, cooperating with the pressure rollers 20, to urge the ends of the pressure rollers 20 vertically upward within the roller-resting aperture 14 is provided in order to cause the endless belt 24 (including start belt 40 segments) to be generally constantly pressured against the carrier rollers 18, and to essentially constantly maintain a predetermined back pressure (e.g. 2%) on the belt 24 in either a forward or a reverse direction with respect thereto. A means, generally illustrated as 44, is provided to adjust the pressure caused by the means to urge 42 which comprises L-shaped angle members 46 having bolts 48 attached thereto and vertically-slidably lodging within angle retention apertures 16 while retaining angle members 46 to support members 12 in order to provide floating vertical adjustment for angle member 46 which in turn would increase the pressure of belt 24 against the carrier rollers 18. It should be pointed out that should it be desired to provide for pressure rollers 20 which do not float (i.e. be free from sliding vertically within apertures 16), this embodiment of the invention would provide such a desire because bolts 48 may be tightened to the point where angle members 46 are steadfast with respect to support members 12. Angle members 46 have a plurality of angle apertures 50 (see FIGS. 6 & 8) wherein bolts52 are vertically disposed. The structure of bolt 52 has a means for resting 54 (i.e. a nut in a preferred embodiment) whereupon angle members 46 rest. Bolts 52 also include a spring biased means 56 (e.g. a spring) surrounding the lower part thereof to vertically urge the means for resting 54 causing the angle members 46 and, in turn, the ends of the pressure rollers 20 to be vertically biased which results in the belt 24 pressurizing the carrier rollers 18.

Means 44 to adjust the pressure caused by the means to urge 42 comprises nuts 58 rotatably-threadedly disposed around the bolts 52 between the means for resting 54 and the spring biased means 56 such as by turning the nuts 58 in a given direction causes either more compression or more expansion of the spring biased means 56 which indirectly results in an increase or decrease in the pressure of the belt 24 against the carrier rollers 18.

With continuing reference to the drawings for operation of the invention, reversible accumulating conveyor 10 utilizes a simple principle of physics; that is, it takes more energy to start something moving than it takes to keep it moving. Carrier rollers 18 are driven by drive means 32 driving belt 24 which has a low co-efficient of friction. Pressure on belt 24 may be increased or decreased by adjusting the pressure rollers 20 located underneath the carrier rollers 18. When properly adjusted in accordance with what was previously mentioned, pressure on belt 24 may only convey moving articles (i.e. those articles placed on carrier rollers 18 and shoved), but will not start articles which have been stopped (i.e. either by hand or hitting another stationary article). Thus, pressure on accumulating articles is near zero. The articles will remain stationary until start belt 40 increases pressure to the carrier rollers 18 causing a positive "start-up" action to accumulated articles. Articles will beging moving in a single file manner and continue to do so until once again stopped. Floating pressure rollers 20 are supported by angle member 46 which, as has been previously disclosed, is spring loaded. This spring loaded feature when used in combination with the start belt 40 feature, will help avoid soft pressure spots when conveying as well as excessive pressure from the start belt 40. Because of the variable pressure, both heavy and light articles may be conveyed or accumulated without damage. Therefore, the need for eccentric rollers and trigger mechanisms is eliminated.

Various alterations may be made in the foregoing constructions without departing from the spirit of the invention, and it is intended that the drawings and embodiments of the invention are to be merely illustrative.

I claim:

1. A reversible accumulating conveyor comprising a pair of support members, each of said support members including a structure defining a plurality of pressure roller-resting apertures; a plurality of carrier rollers connected to the support members and rotatable with respect thereto; a plurality of pressure rollers vertically-slidably disposed within said pressure roller-resting apertures, said pressure roller-resting apertures being positioned lower with respect to the situs of said carrier rollers; support means attached to said support members for positioning said conveyor at a desired height from the floor; a conveyor belt reversible drive means mechanically communicating with the conveyor; an endless conveyor belt being driven by said drive means and being trained over and carried by said pressure rollers; at least one start belt integrally bound to said conveyor belt and having predetermined characteristics distinct with respect to said conveyor belt; and means for vertically urging the ends of said pressure rollers within said pressure roller-resting apertures in order to cause said endless belt to generally maintain a constant pressure against the carrier rollers, excepting when said start belt is carried by said pressure rollers, and to essentially constantly maintain a predetermined back pressure on said conveyor belt in either a forward or a reverse direction with respect thereto;

said means for urging comprises at least one pressure angle member supporting the ends of said pressure rollers, said angle member having a structure defining a plurality of angle apertures; a plurality of bolts vertically disposed within said angle aperture and including a structure having a means for resting the angle member whereupon the angle member rests; and spring-biased means surrounding said bolts to vertically urge said means for resting the angle member causing the the ends of the pressure rollers to be vertically biased and float, resulting in pressurizing the endless belt against the carrier rollers;

said angle members additionally include a structure defining a plurality of second angle apertures, said support members additionally having a structure including a plurality of elongated angle retention apertures capable of registering with said second angle apertures of said angle members, a retention bolt assembly inserting through said second angle apertures and vertically-slidably lodging within said elongated angle retention apertures while slidably retaining said angle members to said support members in order to provide for said floating effect of said pressure rollers when said ends of said pressure rollers are resting on said angle members being spring-biased.

2. The reversible conveyor of claim 1 wherein said pressure rollers are carried by said support members below said carrier rollers and in an offset posture with respect to said carrier rollers.

3. The reversible conveyor of claim 1 additionally including at least one snub roller and one direction roller, both supported by said support members and being an aid to the return course of said conveyor belt, said direction roller having a larger diameter than said snub rollers, said pressure rollers, and said carrier rollers.

4. The reversible conveyor of claim 1 additionally comprising a means for adjusting the pressure caused by said means to urge.

5. The reversible conveyor of claim 4 wherein said means for adjusting comprises a nut assembly rotatably-threadedly disposed around said bolt between said means for resting and said spring biased means such as by turning said nut assembly in a given direction causes either more compression or more expansion of the spring biased means which indirectly results in an increase or decrease in the pressure of the conveyor belt against the carrier rollers.

6. The reversible conveyor of claim 1 wherein said start belt is thicker than said conveyor belt, and said start belt has a higher coefficient of friction than said conveyor belt.

* * * * *